(12) United States Patent
Li et al.

(10) Patent No.: US 6,477,518 B1
(45) Date of Patent: Nov. 5, 2002

(54) METHOD OF KNOWLEDGE-BASED ENGINEERING COST AND WEIGHT ESTIMATION OF AN HVAC AIR-HANDLING ASSEMBLY FOR A CLIMATE CONTROL SYSTEM

(75) Inventors: Yuan John Li, Novi, MI (US); Mawutor Kofi Kpeglo, Canton, MI (US); Yung-Sen Steven Shang, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/495,531

(22) Filed: Jan. 31, 2000

(51) Int. Cl.⁷ ............................................. G06F 17/00
(52) U.S. Cl. ......................................... 706/45; 706/46
(58) Field of Search ..................................... 706/45, 46

(56) References Cited

U.S. PATENT DOCUMENTS

| | | | |
|---|---|---|---|
| 4,912,657 A | 3/1990 | Saxon et al. | 345/853 |
| 5,070,534 A | 12/1991 | Lascellas et al. | 345/764 |
| 5,111,413 A | 5/1992 | Lazansky et al. | 703/14 |
| 5,197,120 A | 3/1993 | Saxton et al. | 345/661 |
| 5,293,479 A | 3/1994 | Quintero et al. | 345/841 |
| 5,799,293 A | 8/1998 | Kaepp | 706/45 |
| 6,113,644 A * | 9/2000 | Weber et al. | 703/8 |
| 6,209,794 B1 * | 4/2001 | Webster et al. | 236/94 |

OTHER PUBLICATIONS

SAE Recommended Practice, "Passenger Car Windshield Wiper Systems–SAE J903c", Nov. 1973.
SAE Recommended Practice, "Motor Vehicle Driver And Passenger Head Position–SAE J1052", May 1987.
SAE Recommended Practice, "Driver Hand Control Reach–SAE J287", Jun. 1988.
SAE Recommended Practice, "Passenger Car Glazing Shade Bands–SAE J100", Mar. 1988.
SAE Recommended Practice, "Accommodation Tool Reference Point–SAE J1516", Mar. 1990.
SAE Recommended Practice, "Driver Selected Seat Position–SAE J1517", Mar. 1990.
SAE Recommended Practice,"Truck Driver Shin–Knee Position For Clutch And Accelerator–SAE J1521", Mar. 1990.
SAE Recommended Practice, "Truck Driver Stomach Position–SAE J1522", Mar. 1990.
SAE Standard, "Devices For Use In Defining And Measuring Vehicle Seating Accomodation–SAE J826", Jun. 1992.
SAE Recommended Practice, "Motor Vehicle Drivers' Eye Locations–SAE J941", Jun. 1992.
SAE Recommended Practice, "Passenger Car Windshield Defrosting Systems–SAE J902", Apr. 1993.
SAE Recommended Practice, "Windshield Wiper Systems–Trucks, Buses, And Multipurpose Vehicles–SAE J198", Jun. 1993.
SAE Recommended Practice, "Motor Vehicle Dimensions––SAE J1100", Jun. 1993.
SAE Recommended Practice, "Describing And Measuring The Driver's Field Of View–SAE J1050", Aug. 1994.

* cited by examiner

Primary Examiner—George B. Davis
(74) Attorney, Agent, or Firm—Larry I. Shelton

(57) ABSTRACT

A method of knowledge-based engineering cost and weight estimation of an HVAC air-handling assembly for a climate control system on a vehicle includes the steps of selecting a parametric model of an HVAC air-handling assembly design using a knowledge-based engineering library stored in a memory of a computer system. The method also includes the steps of selecting a component part from the parametric model of the HVAC air-handling assembly, determining a cost estimate of the component part using the knowledge-based engineering library and using a summation of the component part cost as the cost estimate of the HVAC air-handling assembly. The method further includes the steps of determining a weight estimate of the component part using the knowledge-based engineering library and using a summation of the component part weight as the weight estimate of the HVAC air-handling assembly. The method further includes the steps of using the cost and weight estimate in the HVAC air-handling assembly design.

16 Claims, 11 Drawing Sheets

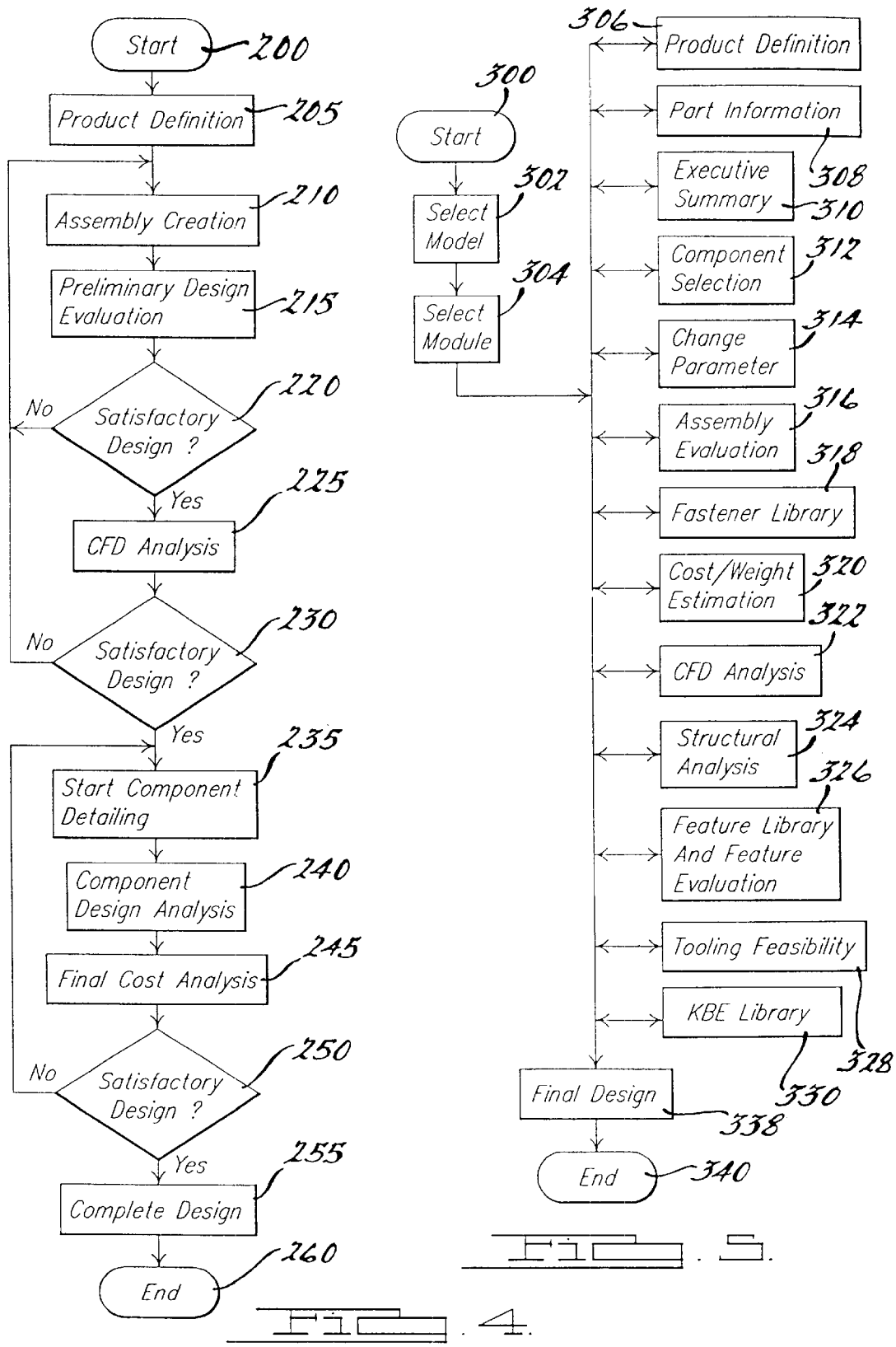

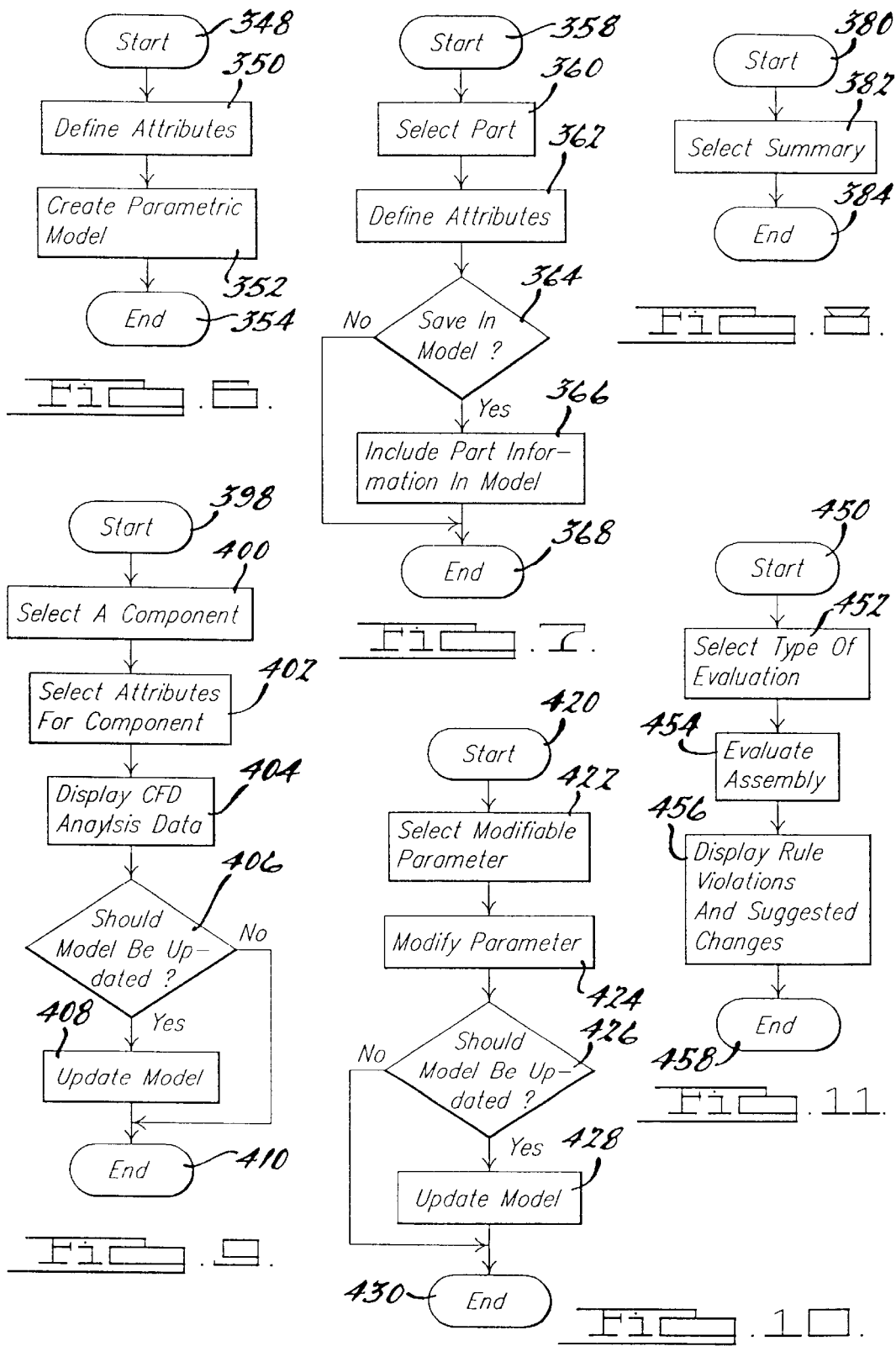

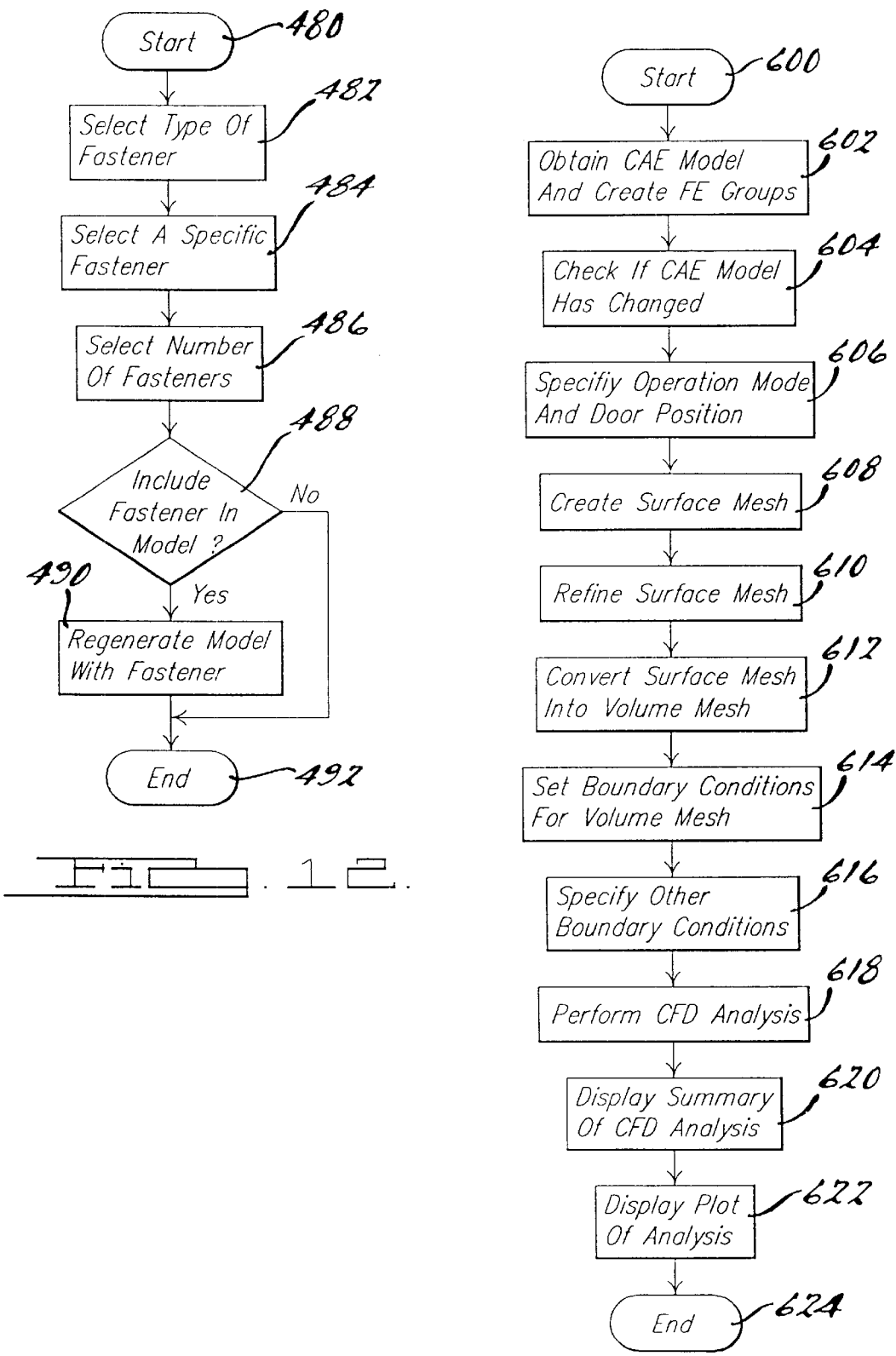

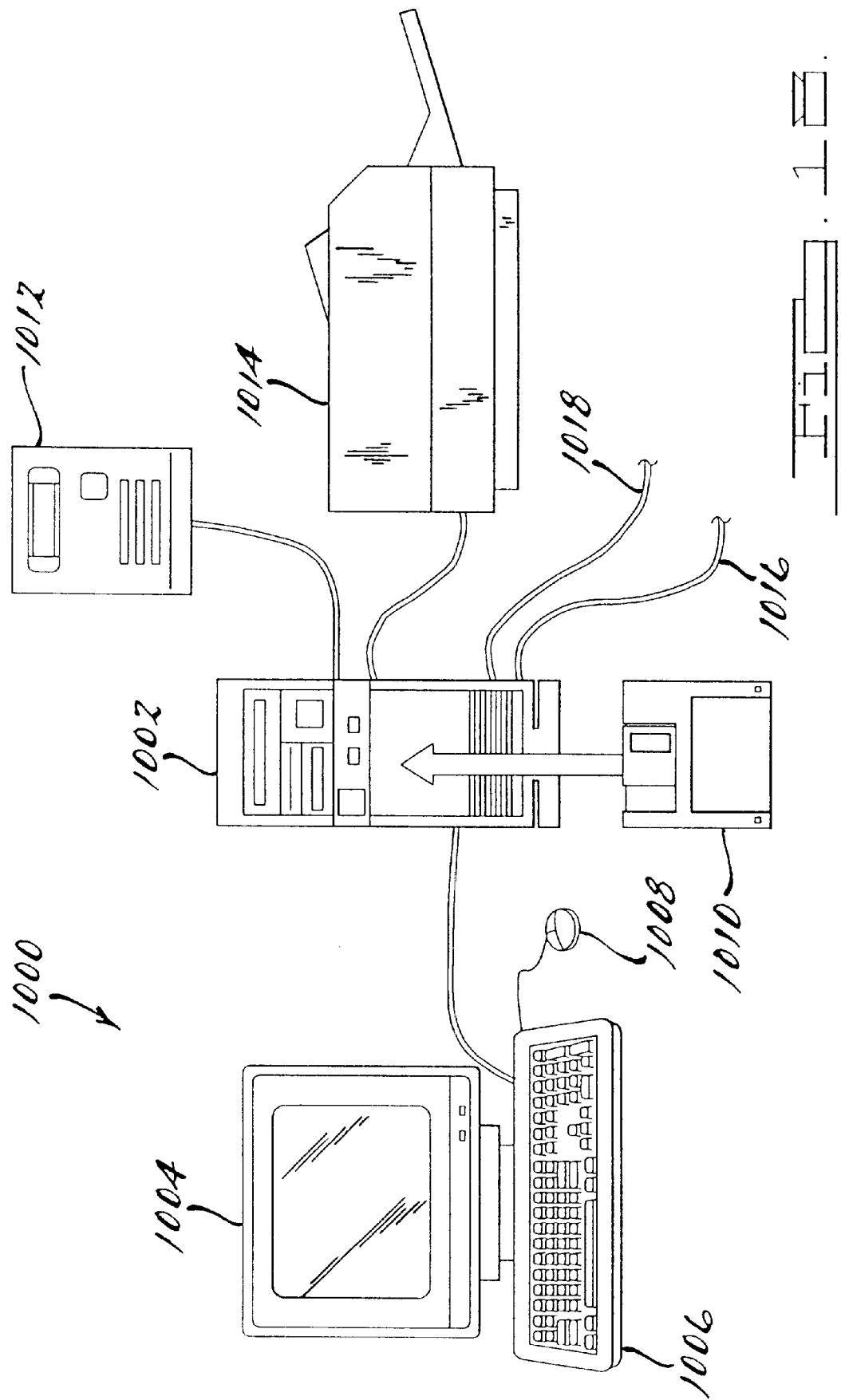

METHOD OF KNOWLEDGE-BASED ENGINEERING COST AND WEIGHT ESTIMATION OF AN HVAC AIR-HANDLING ASSEMBLY FOR A CLIMATE CONTROL SYSTEM

BACKGROUND OF THE INVENTION

1. Field of the Invention

The present invention relates generally to computer-aided design of vehicles and, more specifically, to a method of knowledge-based engineering cost and weight estimation of an HVAC air-handling assembly for a climate control system on a vehicle.

2. Description of the Related Art

Vehicle design, and in particular automotive vehicle design, has advanced to a state in which computer-aided design techniques are frequently utilized to develop a new vehicle in a virtual environment. Computer-aided design is especially beneficial in optimizing the various systems incorporated within a vehicle, to maximize design and functional capabilities of the vehicle systems. One example of a vehicle system is a climate control system, which maintains the temperature of an occupant compartment of the vehicle at a comfortable level by providing heating, cooling and ventilation. Air-handling for the climate control system is by an integrated mechanism referred to in the art as a heating, ventilation and air conditioning (HVAC) assembly.

One aspect of the design task for a vehicle system, such as the climate control, is to ensure that the design of the vehicle system is spatially compatible with a particular environment. Another aspect of the design task is to ensure that the vehicle system meets cost and weight targets. Still another aspect of the design task is to ensure that the design complies with predetermined functional criteria, including performance and durability requirements. In the past, various methods have been utilized to determine whether a proposed design meets such predetermined parameters. For example, a proposed design may be analyzed in two dimensions, which requires many iterations of a drawing. A three-dimensional model may also be constructed to obtain a better perspective of the design. The three-dimensional model may also undergo testing to determine whether it complies with performance and durability criteria. This design method is time consuming and expensive.

It is also known that knowledge-based design methods are being utilized in designing a vehicle system. The knowledge-based design method provides advice to the user of the method learned from knowledge guidelines based on lessons learned from previous designs, and engineering and manufacturing experience. Advantageously, knowledge-based design techniques maximize the amount of knowledge utilized, while developing a new vehicle system in a minimal period of time. An example of a knowledge-based design technique is disclosed in U.S. Pat. No. 5,799,293 to Kaepp, entitled "Method For Optimizing The Design Of A Product Using Knowledge Based Engineering Techniques", the disclosure of which is hereby incorporated by reference.

It is also known to use a computer-aided design technique to design a vehicle system. An example of a computer aided design technique is disclosed in U.S. patent application Ser. No. 08/9848,066 entitled "Method and System For Vehicle Design Using Occupant Reach Zones", the disclosure of which is hereby incorporated by reference. Another example is disclosed in commonly assigned U.S. patent application, Ser. No. 09/356,576 entitled "Method For Designing A HVAC Air-handling Assembly For A Climate Control System," the disclosure of which is hereby incorporated by reference.

While the above design techniques work, they do not integrate the available knowledge-based libraries available to assist in designing an HVAC assembly for a climate control system on a vehicle. Therefore, there is a need in the art to provide a method for estimating the cost and weight of an HVAC assembly for a climate control system on a vehicle using a computer aided design and engineering technique that includes a plurality of integrated knowledge-based libraries.

SUMMARY OF THE INVENTION

Accordingly, the present invention is a method of knowledge-based engineering cost and weight estimation of an HVAC air-handling assembly for a climate control system on a vehicle. The method includes the steps of selecting a parametric model of the HVAC air-handling assembly design using a knowledge-based engineering library stored in a memory of a computer system and selecting a component part from the model of the HVAC air-handling assembly. The method also includes the steps of determining a cost estimate of the component part using the knowledge-based engineering library and using a summation of the component part cost as the cost estimate of the HVAC air-handling assembly. The method further includes the steps of determining a weight estimate of the component part using the knowledge-based engineering library and using a summation of the component part weight as the weight estimate of the HVAC air-handling assembly. The method further includes the steps of using the cost and weight estimate in HVAC air-handling assembly design.

One advantage of the present invention is that an improved method of knowledge-based engineering cost and weight estimation of an HVAC air-handling assembly for a climate control system on a vehicle is provided that considerably reduces design time and related expenses. Another advantage of the present invention is that a method of knowledge-based engineering cost and weight estimation of an HVAC air-handling assembly for a climate control system on a vehicle is provided that utilizes parametric automated design in light of predetermined design, manufacturing and engineering criteria. Yet another advantage of the present invention is that a method of knowledge-based engineering cost and weight estimation of an HVAC air-handling assembly for a climate control system on a vehicle is provided that allows analysis of an occupant's thermal comfort early in the design process using knowledge-based design rules and parametric constraints. Still another advantage of the present invention is that a method of knowledge-based engineering cost and weight estimation of an HVAC air-handling assembly for a climate control system on a vehicle is provided which supports computer-aided engineering analysis (CAE) and rapid prototyping. A further advantage of the present invention is that a method of knowledge-based engineering cost and weight estimation of an HVAC air-handling assembly for a climate control system on a vehicle is provided which enhances informed decision making regarding cost and weight factors in furtherance of vehicle timing considerations.

Other features and advantages of the present invention will be readily appreciated, as the same becomes better understood after reading the subsequent description taken in conjunction with the accompanying drawings.

BRIEF DESCRIPTION OF THE DRAWINGS

FIG. 4 is a flowchart of a method of knowledge-based engineering cost and weight estimation of an HVAC air-handling assembly for a climate control system on a vehicle, according to the present invention.

FIGS. 5, 6, 7, 8, 9, 10, 11, 12, 13a, 13b, 14, 15, 16 and 17 are flowcharts of another embodiment of a method of knowledge-based engineering cost and weight estimation of an HVAC air-handling assembly for a climate control system on a vehicle, according to the present invention.

FIG. 18 is an elevational view of a system for designing the HVAC air-handling assembly, according to the present invention.

DESCRIPTION OF THE PREFERRED EMBODIMENT(S)

Vehicle design, and in particular the design of an HVAC air-handling assembly 10 (FIG. 2) for a climate control system on a vehicle, is achieved according to the present invention with a generic parametric driven design process. Advantageously, this process allows flexibility in vehicle design and engineering analysis of the design in a fraction of the time required using conventional design methods. Various computer-based tools are integrated to achieve this enormous time and expense savings, including solid modeling, parametric design, automated studies and a knowledge-based engineering library.

Figure 1:
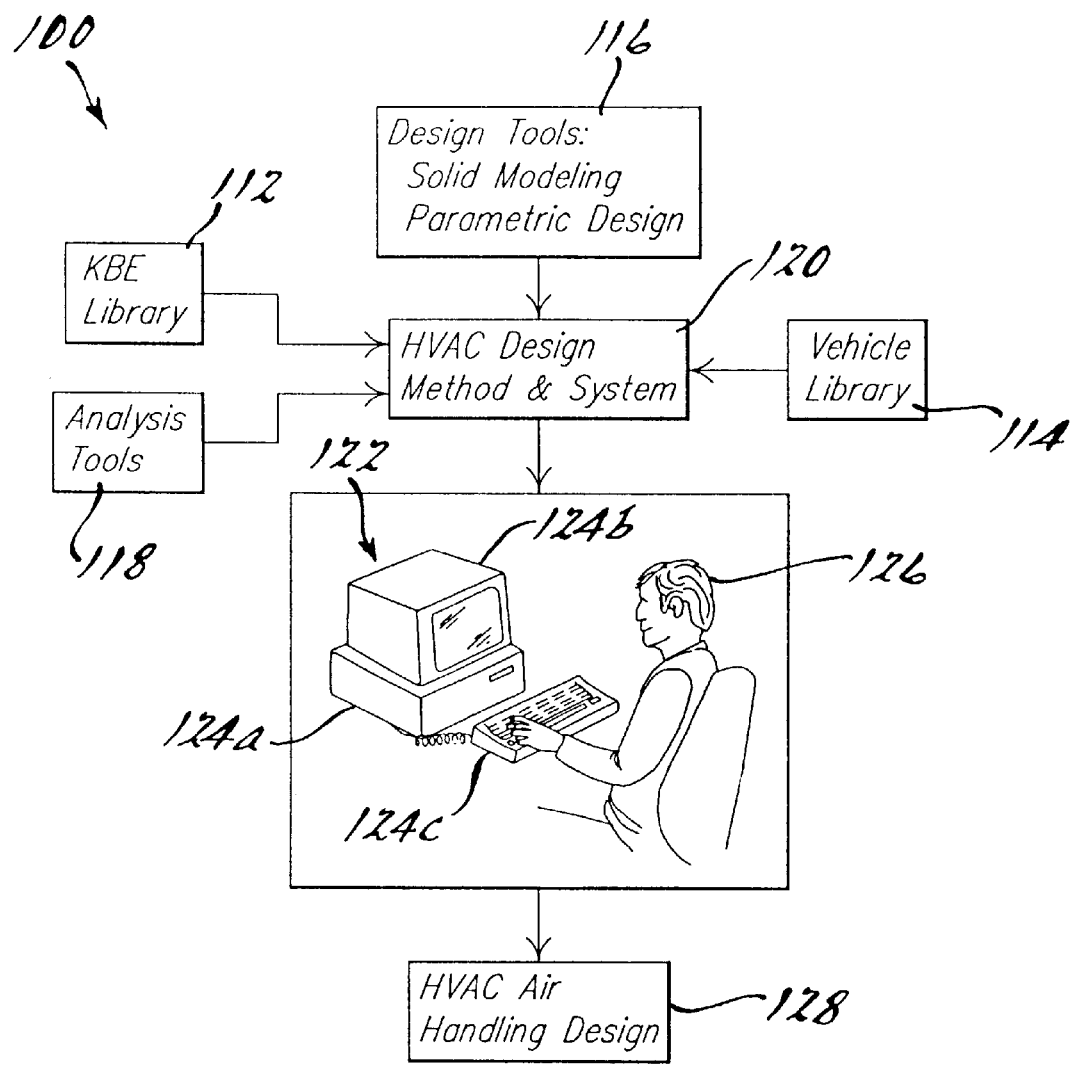
FIG. 1 is a block diagram of a system which may be utilized with a method of knowledge-based engineering cost and weight estimation of an HVAC air-handling assembly for a climate control system on a vehicle, according to the present invention.

Referring to the drawings and in particular FIG. 1, the tools 100 used by a method for cost and weight estimation of an HVAC air-handling assembly 10 for a climate control system on a vehicle, according to the present invention, are illustrated graphically. The tools 100 include a knowledge-based engineering library 112 stored on an electronic storage device (not shown). The knowledge-based engineering library 112 is a database of sub-libraries providing an electronic representation of various experts' knowledge of information relevant to the design of the HVAC air-handling assembly 10 for a climate control system on a vehicle. The knowledge-based engineering library 112 also includes design and assembly rules, guidelines and information in electronic form regarding various types of HVAC air-handling assembly architectures and component parts.

For example, the knowledge-based engineering library may include a component parts library. The component parts library may contain a parametric solid model of a particular component part, as well as parameters defining characteristics of the component part. A user 126 may select the parameters that are relevant to the design of the HVAC air-handling assembly 10. For example, a relevant vehicle system may include a condenser (not shown), fan (not shown), or engine (not shown). The knowledge-based engineering library 112 may also include a fastener library, a feature library and a cost/weight library, to be described.

The tools 100 also include a vehicle library 114 stored on the electronic storage device. The vehicle library 114 is an electrical representation of a vehicle model or a portion thereof. Advantageously, the vehicle library 114 may contain a parametric solid model of an exterior portion of a particular vehicle, or the HVAC air-handling assembly 10. In this example, the vehicle library 114 may include a parametric model of an occupant compartment portion of the vehicle.

Also, the vehicle library 114 may contain parameters defining various vehicles and vehicle system characteristics, such as interior size and vehicle body style. It should be appreciated that the vehicle library 114 may be a sub-library of the knowledge based engineering library 112.

The tools 100 may also include various design tools, shown generally at 116, which can be used for the design method, to be described. These design tools 116 may include solid modeling and parametric design techniques. Solid modeling, for example, takes electronically stored vehicle model data from the vehicle library 114 and standard component parts data from the knowledge-based engineering library 112 and builds complex geometry for part-to-part or full assembly analysis. Several modeling programs are commercially available and generally known to those skilled in the art.

The parametric design technique is used in the electronic construction of vehicle geometry within a computer system 122 (to be described) for designing a vehicle system, such as the HVAC air-handling assembly 10. As a particular dimension or parameter is modified, the computer system 122 is instructed to regenerate a new vehicle or part geometry. The parametric HVAC air-handling assembly information, from the knowledge-based information engineering library 112, control and limit the design process in accordance with predetermined design parameters.

The tools 100 also include various computer-aided engineering (CAE) analytical tools 118. One example of an engineering analysis technique is computational fluid dynamics (CFD), as is known in the art. Another example of an engineering analysis technique is finite element analysis (FEA), as is also known in the art. Yet another example is a human factors study, as is further known in the art.

The tools 100 further include the computer system 122, as is known in the art, to implement a method 120 of knowledge-based engineering cost and weight estimation. The computer system 122 includes a processor and a memory 124a, which can provide a display and animation of a system, such as the HVAC air-handling assembly 10, on a display such as a video terminal 124b. Parametric selection and control for the design can be achieved by the user 126, via a user interactive device 124c, such as a keyboard or a mouse. The user 126 inputs a set of parameters and set of instructions into the computer system 122 when prompted to do so. The set of parameters and the set of instructions may be product specific, wherein other data and instructions nonspecific to the product may already be stored in the memory 124a.

One example of an input method is a pop-up window with all current parameters, including an on-line description for the parameter and a current value therefore. For example, parametric values may be chosen from a table within a two-dimensional mode, since some vehicle designers prefer to view an assembly in sections which can be laid out on a drawing.

Once the computer system 122 receives the set of parameters and instructions from the user 126, and any information regarding related vehicle systems and information from the libraries 112, 114, and analysis tools 116, 118, the computer system 122 utilizes a method 120, discussed in detail subsequently, to determine whether requirements have been met.

Advantageously, the computer implemented method of cost and weight estimation of a HVAC air-handling assembly 10 (to be described) combines all of the foregoing to provide an efficient, flexible, rapid design of an HVAC air-handling assembly 10 for a climate control system on a vehicle. Further, the HVAC air-handling assembly cost and weight estimate 128 is an output of the method 120 and the HVAC air-handling assembly cost and weight estimate 128 is available for further analysis and study.

Figure 2:
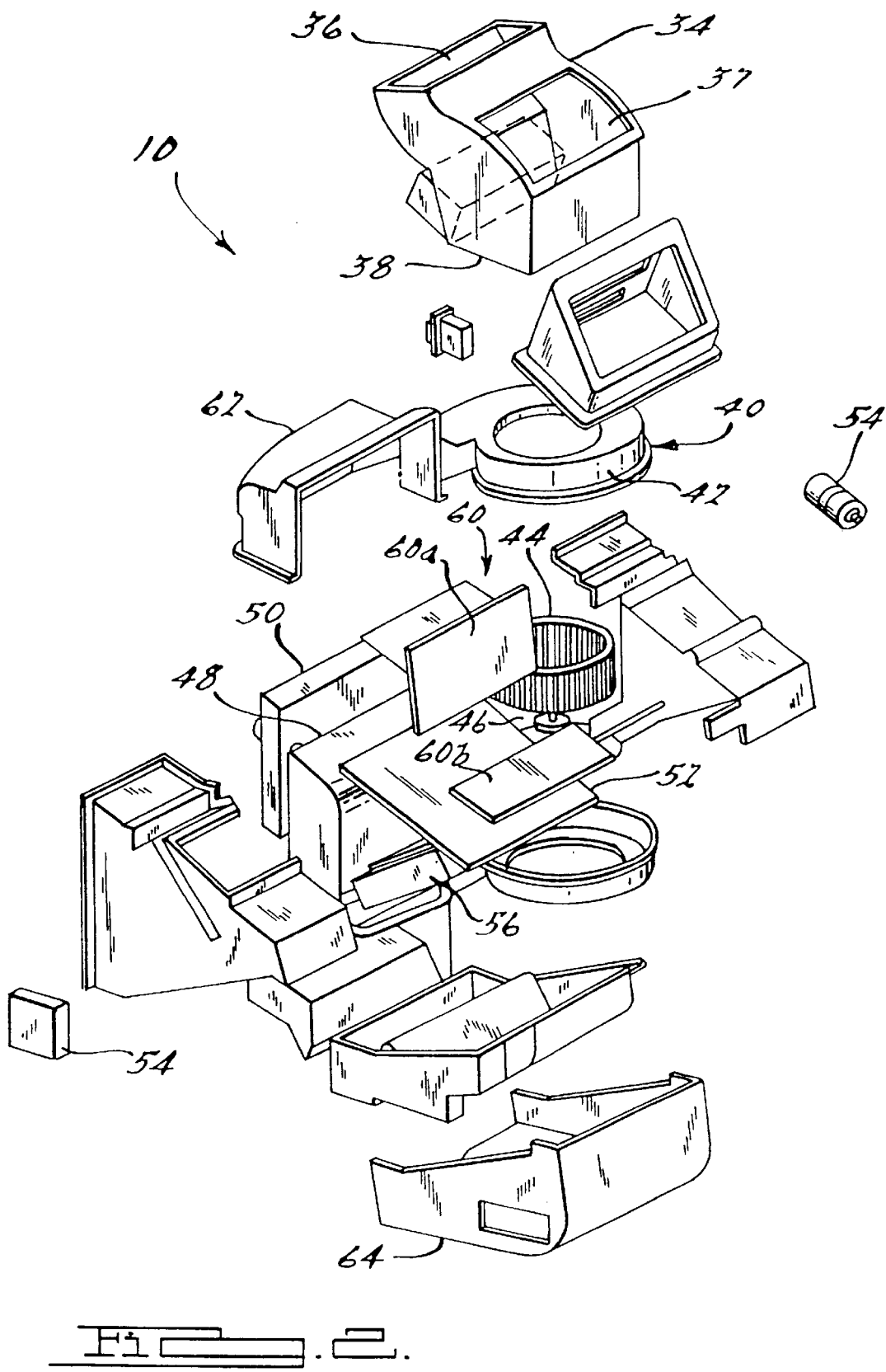
FIG. 2 is an exploded view of an HVAC air-handling assembly for a climate control system.
Figure 3:
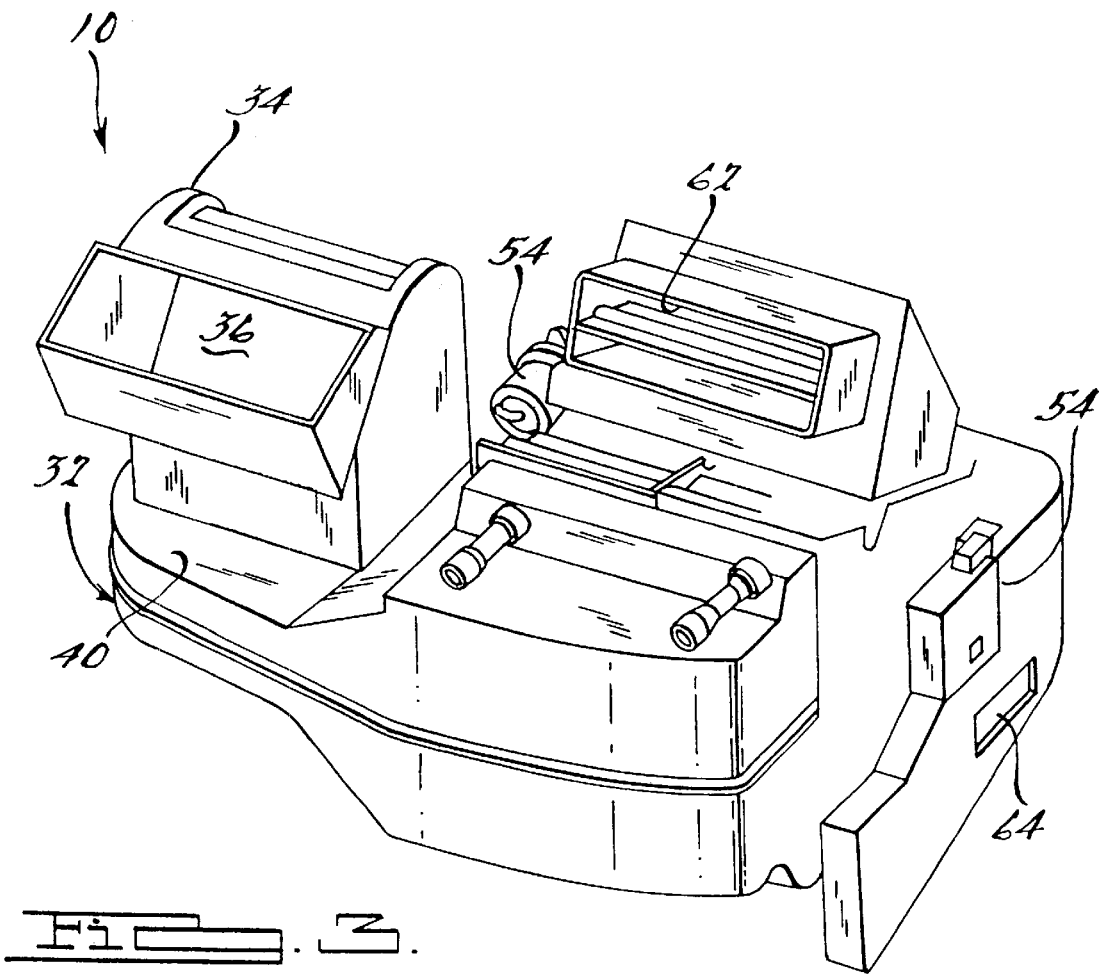
FIG. 3 is a perspective view of the HVAC air-handling assembly of FIG. 2.

Referring to FIGS. 2 and 3, one embodiment of an HVAC air-handling assembly 10 for a climate control system (not shown) on a vehicle (not shown) is illustrated. The climate control system generally provides for heating, ventilation and air conditioning (HVAC) of an occupant compartment (not shown) of the vehicle. Advantageously, the climate control system provides for a comfortable interior temperature of the occupant compartment, and good visibility through the windshield (not shown) and other windows (not shown) of the vehicle. It should be appreciated that the interior temperature of the vehicle may be affected by factors such as occupant compartment temperature, ambient temperature, sunload, external air flow and heat radiation.

The climate control system also includes an air-flow handling system, referred to in the art as the heating, ventilation and air conditioning (HVAC) air-handling assembly 10. It should be appreciated that, in this example, the thermal management of the heating, cooling and ventilation functions is integrated into one system. The HVAC air-handling assembly 10 conditions a flow of air by heating or cooling the airflow and distributing the flow of conditioned air to the interior of the occupant compartment of the vehicle. It should be appreciated that, in this example, the HVAC air-handling assembly 10 is positioned on the occupant compartment side of a dash panel (not shown), below an instrument panel. Also, in this example, the HVAC air-handling assembly 10 includes a case 32, having a preferred architecture, to package the individual component parts of the HVAC air-handling assembly 10, to be described.

The HVAC air-handling assembly 10 includes an air inlet duct 34. The air inlet duct 34 includes an interior chamber (not shown) that is hollow, for receiving air to be conditioned. The air inlet duct 34 includes an inlet opening to allow the ingress of air to be conditioned into the interior chamber. The air inlet duct 34 receives air from outside of the vehicle 12, or recirculated air from inside the occupant compartment of the vehicle 12.

In this example, there is an outside air inlet opening 36 for receiving outside air, such as through a vent located near a windshield portion of the vehicle 12 and a recirculated air inlet opening 37 for receiving recirculated air from the occupant compartment. Preferably, the openings 36,37 are covered by a door (not shown) that operatively controls the ingress of air. The door is actuable between multiple conditions, including one hundred percent outside air and no recirculated air, one hundred percent (100%) recirculated air and no outside air, and a mixture of outside air and recirculated air. It should be appreciated that the size of the air inlet duct 34 and position relative to the case 32 is part of an HVAC assembly architecture. The air inlet duct 34 also includes an egress opening 38 for the air to leave the interior chamber of the air inlet duct 34.

The HVAC air-handling assembly 10 also includes a blower assembly 40 operatively connected to the egress opening 38 in the air inlet duct 34. The blower assembly 40 pulls air through the air inlet duct 34 and forces it through the rest of the HVAC air-handling assembly 10, in a manner to be described. The blower assembly 40 includes a scroll assembly 42 having a wheel 44 and a motor 46, as it is known in the art. Preferably, the motor 46 is part of a centrifugal blower function for the blower assembly 40.

The HVAC air-handling assembly 10 further includes an evaporator core 48 operatively connected to the blower assembly 40, that receives the flow of air to be conditioned. Depending on the operational mode selected, the flow of air to be conditioned is either outside air, or recirculated air from the occupant compartment. It should be appreciated that, in this example, there is a filter 50 positioned between the blower assembly 40 and the evaporator core 48, to filter the air before it passes through the evaporator core 48. The evaporator core 48 cools and dehumidifies the air to be conditioned, by the thermodynamic transfer of heat from the air to be conditioned to a refrigerant, as is known in the art. The now conditioned air exits the evaporator core 48 and is distributed in a manner to be described.

The HVAC air-handling assembly 10 also includes a blend door 52 that diverts the flow of conditioned air leaving the evaporator core 48 to adjust the temperature of the air, depending on the selected operational and temperature modes. It should be appreciated that the blend door 52 may be actuated by an actuator 54. The actuator 54 may be electrically operated, mechanically operated, or vacuum operated, as is known in the art. The blend door 52 directs the flow of air either into a heater core 56, to be described, or to bypass the heater core 56, or partially through the heater core 56.

The HVAC air-handling assembly 10 includes a heater core 56 that receives a flow of air to be heated and a coolant fluid, which, in this example, is engine coolant as is known in the art. The heater core 56 heats the air by the thermodynamic transfer of heat from the coolant fluid.

The HVAC air-handling assembly 10 also includes an air mix door 60, in communication with a duct (not shown). The air mix door 60 directs the flow of conditioned air from the evaporator core 48, or heater core 56, or a combination of both, into the duct for distribution in the occupant compartment, depending on the selected air distribution mode. In this example, a first air mix door 60a operatively directs the flow of now conditioned air through a panel duct (not shown) in the instrument panel or floor duct (not shown) and into the occupant compartment. A second air mix door 60b operatively directs the flow of conditioned air through the panel duct or a defroster duct (not shown), and into the occupant compartment.

Preferably, the HVAC air-handling assembly 10 includes other component parts, such as valves (not shown) and switches (not shown), which are conventional and well known in the art to operatively transfer and condition the airflow.

Referring to FIG. 4, a flowchart of a method of knowledge-based engineering cost and weight estimation of an HVAC air-handling assembly 10, according to the present invention, is illustrated. The methodology begins in bubble 200, when it is called for by the user 126. The methodology advances to block 205 and the user 126 defines parameters of the HVAC air-handling assembly 10 for a climate control system on a particular vehicle type using the knowledge-based engineering library 112.

For example, one parameter from the vehicle platform library 114 within the knowledge-based engineering library 112 is information in electronic form regarding the vehicle environment, including interior size and vehicle body style.

Another parameter includes manufacturing specifications, cost and weight assumptions and engineering performance objectives. Still another parameter from the knowledge-based engineering library 12 is information in electronic form regarding vehicle systems, including the instrument panel, and components disposed therein. Yet another parameter is a parametric model of the HVAC air-handling assembly 10, as defined by coordinates in space that reference the general shape of the HVAC air-handling assembly 10 and position the HVAC air-handling assembly 10 with respect to a parametric model of the instrument panel. In particular, these coordinate points define specific reference points on the HVAC air-handling assembly 10 for determining the shape and attachment of the HVAC air-handling assembly 10. The methodology advances to block 210.

In block 210, the methodology creates a preliminary model of a HVAC air-handling assembly design using the parameters defined in block 205. The preliminary model of the HVAC air-handling assembly design is generated using a design tool 116 such as a computer aided design (CAD) technique, as is known in the art. Preferably, the appropriate relationship between the HVAC air-handling assembly 10, instrument panel, vehicle body and other vehicle structures are automatically determined and based upon the parametric information provided.

It should be appreciated that packaging refers to an electronic representation of the dimensions of the system, device or component as it geometrically relates to a three-dimensional reference frame of the vehicle. These vehicle systems may include, but are not limited to the instrument panel, the dash panel, and the HVAC air-handling assembly 10. A vehicle system is intended to include any part of the vehicle which will interact with the HVAC air-handling assembly 10 either directly or indirectly.

The methodology advances to block 215 and evaluates the preliminary model of the HVAC air-handling assembly design by comparing the preliminary HVAC air-handling assembly design to predetermined criteria, such as rules or guidelines from the knowledge-based engineering library 112 setting forth design or performance expectations. An example of a predetermined performance criteria is temperature distribution. An example of a predetermined design criteria is an evaporator core 48 positioning angle, which affects the drainage of any condensed water. The methodology advances to diamond 220 and determines from the comparison in block 215 if the predetermined criteria from the knowledge-based engineering library is met by the preliminary model of the HVAC air-handling assembly design. If the predetermined criteria are not met, the methodology returns to block 210 previously described, and parametrically modifies the model of the preliminary HVAC air-handling assembly design. Returning to diamond 220, if the predetermined criteria are met, the methodology advances to block 225.

In block 225, the methodology evaluates the preliminary HVAC air-handling assembly design using an analysis tool 118, such as CFD. The methodology advances to diamond 230 and compares the results of the CFD analysis to a predetermined performance criteria, such as a rule or guideline within the knowledge-based engineering library 112 to determine if the results of the CFD analysis of the preliminary HVAC air-handling assembly design meets the predetermined performance criteria. If the CFD analysis does not meet the predetermined performance criteria, the methodology returns to block 210, previously described, and revises the characteristics of the preliminary HVAC air-handling assembly design. Returning to diamond 230, if the results of the CFD analysis does meet the predetermined performance criteria, the methodology advances to block 235.

In block 235, the methodology parametrically creates a more detailed model of the HVAC air-handling assembly design by adding additional features to the model from a feature library within the knowledge-based engineering library 112. It should be appreciated that the additional features provide a more detailed representation of the surface of the HVAC air-handling assembly 10, and include features such as bosses and fasteners.

The methodology advances to block 240. In block 240, the detailed model of the HVAC air-handling assembly design is analyzed by comparing the model to the rules and guidelines in the knowledge-based engineering library 112, such as those for tooling feasibility, CAE, CFD, or human factors. The methodology advances to block 245 and performs a cost or weight analysis of the detailed design of the HVAC air-handling system 10. The methodology advances to diamond 250.

In diamond 250, the methodology determines if the detailed design meets a predetermined cost or weight criteria maintained within a cost database in the knowledge-based engineering library 112. If the predetermined design, performance, cost or weight criteria are not met, the methodology returns to block 235 and revises the parameters. Returning to diamond 250, if the predetermined criteria is met, the methodology advances to block 255.

In block 255, the design of the HVAC air-handling assembly 10 is complete. The methodology advances to bubble 260 and ends.

Referring to FIGS. 5 through 17, a detailed example of another embodiment, according to the present invention, of the method of knowledge-based engineering cost and weight estimation of the HVAC air-handling assembly 10 is illustrated. The methodology begins in bubble 300, when it is called for by the user 126. The methodology advances to block 302 and the user 126 selects a vehicle type from a database within the knowledge-based engineering library 112, such as the vehicle platform library 114, as previously described. The methodology advances to block 304 and the user 126 selects a knowledge-based module to parametrically develop a model of an HVAC air-handling assembly design. It should be appreciated that the user 126 may determine the order in which the knowledge-based modules are accessed.

If a product definition module is selected, the methodology advances to block 306, and continues to bubble 348 shown in FIG. 6. Advantageously, the product definition module enable the user 126 to access information regarding the HVAC air-handling assembly 10 and its environment, including product specifications, target performance goals, component part properties and materials, and manufacturing and cost analysis. The methodology begins in bubble 348 and advances to block 350.

In block 350, the user 126 interactively defines parameters to create a model, such as a parametric model, of the HVAC air-handling assembly design using attributes contained within the knowledge-based engineering library 112. An example of a parameter includes model year, effective date, vehicle type, production volume, and manufacturing facility. Other parameters include HVAC air-handling system architecture, air temperature control type, type of mechanism for controlling the blend door, filter type, number of user control units, target cost and target weight. The methodology advances to block 352.

In block 352, the user 126 generates a parametric model of the HVAC air-handling assembly 10. The parameters defined in block 350 are included in the model. The methodology advances to bubble 354 and returns to block 304 in FIG. 5.

Referring back to block 304 in FIG. 5, if the user 126 interactively selects a part information module from the knowledge-based engineering library, the methodology advances to block 308 and continues to bubble 358 shown in FIG. 7. Advantageously, the part information module allows the user 126 to interactively provide detailed parameters regarding a component part to be included with a model of the HVAC-air-handling assembly design. It should be appreciated that the product definition module and part information module may be combined. The methodology begins in bubble 356 and advances to block 360. In block 360, the user 126 interactively selects a component part from the knowledge-based engineering library for inclusion in the model. An example of a component part is the blower assembly 40, the filter 50, or the heater core 56 previously described. The methodology advances to block 362.

In block 362, the user defines parameters for the component part from a list of attributes in the knowledge-based engineering library 112. One example of a parameter is a material. Another example is a material supplier. Another example is whether the component part is manufactured internally or purchased. Still another example is whether the component part is a new or an existing, carry-over part. The methodology advances to diamond 364 and the user 126 selects whether the component part information should be included as part of the model. If the component part information should be included, the methodology advances to block 366 and includes the part information in the model. The methodology advances to bubble 368 and returns to block 304 in FIG. 5. Returning to diamond 364, if the component part information should not be included, the methodology advances to bubble 368 and returns to block 304 in FIG. 5.

Returning to block 304 in FIG. 5, if an executive summary module is selected, the methodology advances to block 310. Advantageously, the executive summary module provides a summary of parameters and part information defined for the model of the HVAC air-handling assembly 10. The methodology advances to bubble 380 shown in FIG. 8 and advances to block 382. In block 382, the user 126 selects a summary. For example, the user 126 may select to view a summary of the product definition parameters, or part information parameters or component selection parameters. It should be appreciated that the executive summary may be displayed on a video terminal 124b and the user 126 may select to have the executive summary printed on a printer 1014. (FIG. 18). The methodology advances to bubble 384 and returns to block 304 in FIG. 5.

Referring back to block 304, if the user 126 selects a component selection module, the methodology advances to block 312. Advantageously, the component selection module allows the user 126 to select a particular component part from a component part library maintained in the knowledge-based engineering library 112 for inclusion in the model. The component part library contains detailed information regarding a particular component part. The detailed information regarding the component part may influence the performance and configuration of the HVAC air-handling assembly 10.

The methodology advances to bubble 398 shown in FIG. 9 and continues to block 400. In block 400, the methodology selects a component part to be included in the model. An example of a component part is the heater core 56, evaporator core 48, blower assembly 40, or actuator 54 previously described. The methodology advances to block 402 and selects a parameter for the selected component part. An example of a parameter for the heater core is the size of the core. The methodology advances to block 404 and performance criteria from the knowledge-based engineering library 112 is displayed on the video terminal 124b for the selected component. An example of a performance criteria is CFD analysis performance criteria of performance and heat transfer coefficients. The methodology advances to diamond 406 and the user 126 selects whether to update the model of the HVAC air-handling assembly 10 to include the selected component part. If the model should not be updated, the methodology advances to bubble 410 and returns block 304 in FIG. 5.

Returning to diamond 406, if the model should be updated, the methodology advances to block 408 and updates the model of the HVAC air-handling assembly design by generating a new model that includes the selected component parts. The methodology advances to bubble 410 and returns to block 304 in FIG. 5.

Referring back to block 304, if a change parameter module is selected, the methodology advances block 314. The methodology advances to bubble 420 shown in FIG. 10. Advantageously, the change parameters module displays a list of modifiable component parts and corresponding parameters, and evaluates the proposed modifications to the parameters. In bubble 420, the methodology advances to block 422.

In block 422, the user selects a modifiable parameter for a component part within the model of the HVAC air-handling assembly 10. It should be appreciated that the knowledge-based engineering library 112 includes a list of modifiable parameters and predetermined values assigned to these parameters. The methodology advances to block 424 and the user 126 may select a new value for the parameter. Preferably, an error message is generated if the user 126 selects a value for the parameter that is outside a predetermined range for the parameter. Advantageously, the user 126 may view on the video terminal 124b an enlarged version of the HVAC air-handling-assembly model that includes the modified parameter. The methodology advances to diamond 426.

In diamond 426, the user 126 may select whether to update the model of the HVAC air-handling assembly design with the modified parameters. If the user 126 selects not to update the model, the methodology advances to bubble 430 and returns to block 304 in FIG. 5. Returning to diamond 426, if the user 126 selects to update the model, the methodology advances to block 428. In block 428, the methodology regenerates the model of the HVAC air-handling assembly design using the modified parameters. The methodology advances to block 430 and returns to block 304 of FIG. 5.

Referring back to block 304 of FIG. 5, if an assembly evaluation module is selected, the methodology advances to block 316. Advantageously, the assembly evaluation module provides a check of predetermined parameters for the model of the HVAC air-handling assembly design against a predetermined knowledge-based rule or guideline maintained in the knowledge-based engineering library 112. The methodology advances to bubble 450 in FIG. 11 and advances to block 452.

In block 452, the user 126 selects a type of evaluation. For example, a critical dimension can be checked against an established design rule to ensure the integrity of the model, such as rules for evaporator core angle, wall thickness or drainage angle. Similarly, tooling accessibility can be checked to determine if a tool can access a hole without encountering any interference.

The methodology advances to block 454. In block 454, the methodology evaluates the model of the HVAC air-handling assembly design by comparing the model to knowledge-based rules maintained within the knowledge-based engineering library. The methodology advances to block 456 and displays a warning message of any knowledge-based rule violation that is found, and provides a suggestion on how to correct the rule violation. The methodology advances to block 458 and returns block 304 in FIG. 5.

Returning to block 304, if the user selects a fastener library module, the methodology advances to block 318. In block 318, the methodology advances to bubble 480 in FIG. 12. Advantageously, the fastener library is a database within the knowledge-based library containing available fasteners and a description of their characteristic features, so that a fastener is easily incorporated within the HVAC air-handling assembly design.

In bubble 480, the methodology advances to block 482. In block 482, the user 126 selects a type of fastener from a predetermined list of fasteners to be included within the model of the HVAC air-handling assembly 10. Examples of fastener types include a screw, a nut, a stud, a clip, a pin, or a strap. The methodology advances to block 484 and selects a specific fastener of the type designated in block 482, from a list of available fasteners displayed on the video terminal 124b. Advantageously, the list includes information regarding specific characteristics of the fastener including size, pitch and length. The methodology advances to block 486 and selects a quantity of the selected specific fastener to be included in the model of the HVAC air-handling assembly design. The methodology advances to diamond 488.

In diamond 488, the user 126 determines if the selected fastener should be included in the model of the HVAC air-handling assembly design. If the selected fastener should not be included in the model, the methodology advances to bubble 492 and returns to block 304 in FIG. 5. Returning to diamond 488, if the selected fastener should be included in the model, the methodology advances to block 490. In block 490, the methodology regenerates the model of the HVAC air-handling assembly design to include the selected fastener. The methodology advances to bubble 492 and returns to block 304 in FIG. 5.

Returning to block 304 in FIG. 5, if a cost/weight estimation module is selected, the methodology advances to block 320. Advantageously, the cost/weight estimation module provides the user 126 with a summary of predicted cost and weight information pertaining to the model of the HVAC air-handling assembly design, for comparison with predetermined cost and weight targets. In block 320, the methodology advances to bubble 500, shown in FIG. 13a.

In bubble 500, the methodology advances to block 502. In block 502, the user 126 selects whether to determine a cost estimate or a weight estimate. If a cost estimate is selected, the methodology advances to block 504. In block 504, the methodology prepares a bill of materials for the HVAC air-handling assembly model. Preferably, the bill of materials is a list of component parts included in the model of the HVAC air-handling assembly design. The methodology advances to diamond 506 and determines if a particular component part on the bill of materials is a manufactured component part or a purchased component part.

If the particular component part from the bill of materials is a manufactured component part, the methodology advances to block 508 and determines manufacturing parameters for the component part. An example of a manufacturing parameter is material. Another example is density and wall thickness of a molded part. The methodology advances to block 510 and determines a volume for the component part from the parameters defined for the component part in the product definition module. The methodology advances to block 512 and computes a heuristic formula, as is known in the art, for estimating the cost of the component part, using the manufacturing parameters. The methodology advances to block 512. In block 512, the methodology determines a cost for the component part using the heuristic formula and component part volume. The methodology advances to block 524, to be described.

Returning to diamond 506, if the methodology determines that the component part is a purchased part, the methodology advances to diamond 516. In diamond 516, the methodology determines if the component part is a new part or an old part, such as by comparing part numbers. If the component part is a new part, the methodology advances to block 518. In block 516, the methodology determines an average cost of comparable parts from a database of component part costs maintained in the knowledge-based engineering library 112. It should be appreciated that in this example the cost database and weight database are combined into a cost/weight library within the knowledge-based engineering library 112. The methodology advances to block 522 to be described.

Returning to diamond 516, if an old component part is selected, the methodology uses the actual component part cost for the component from the database of component part costs in the knowledge-based engineering library 112. The methodology advances to block 522.

In block 522, the methodology assigns the component part the purchased component cost and advances to block 524. In block 524, the methodology determines a total cost for the HVAC air-handling assembly 10 by incrementally adding together all of the individual component part costs. The methodology advances to bubble 556 and returns to block 304 in FIG. 5.

Figure 13A:
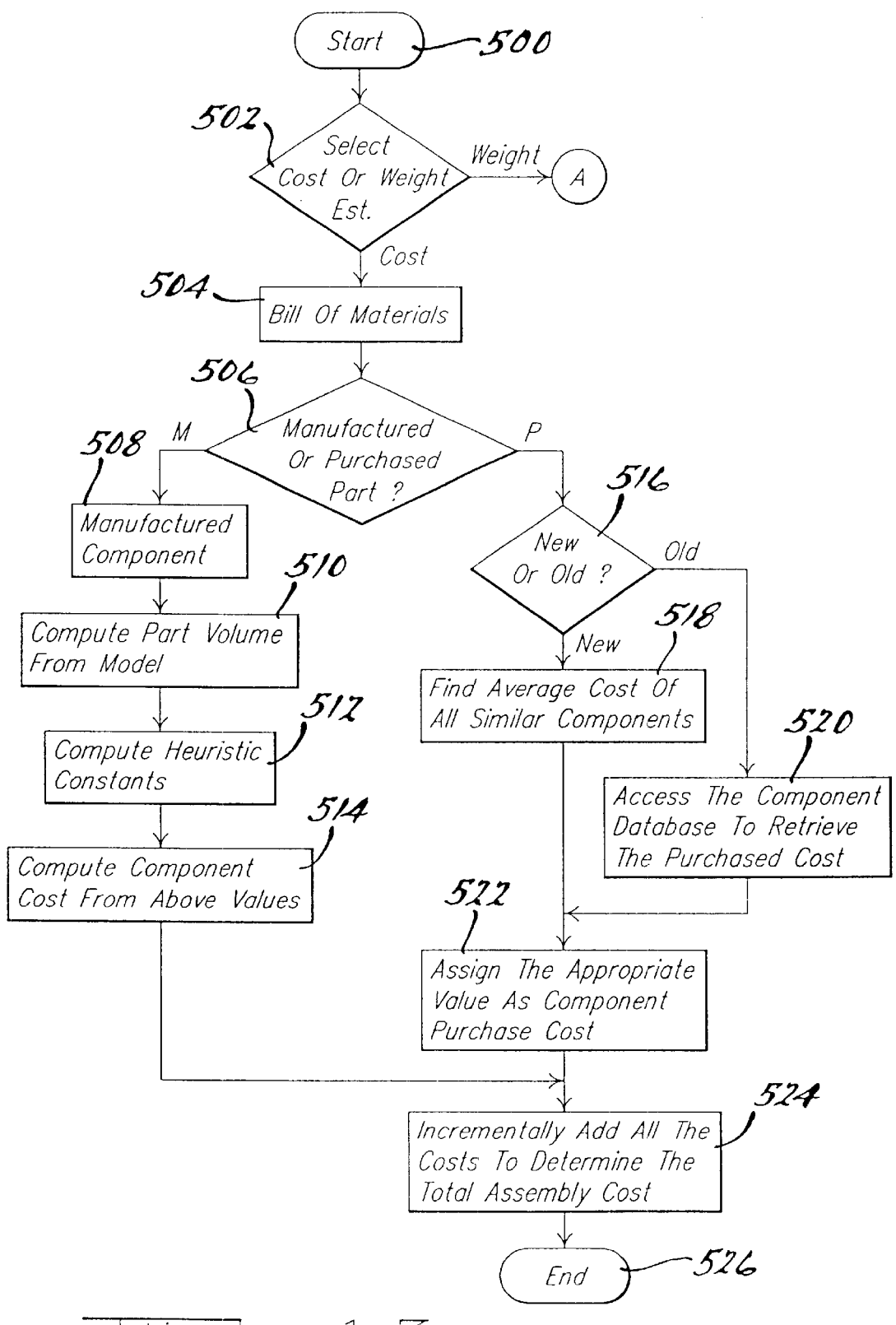
Figure 13B:
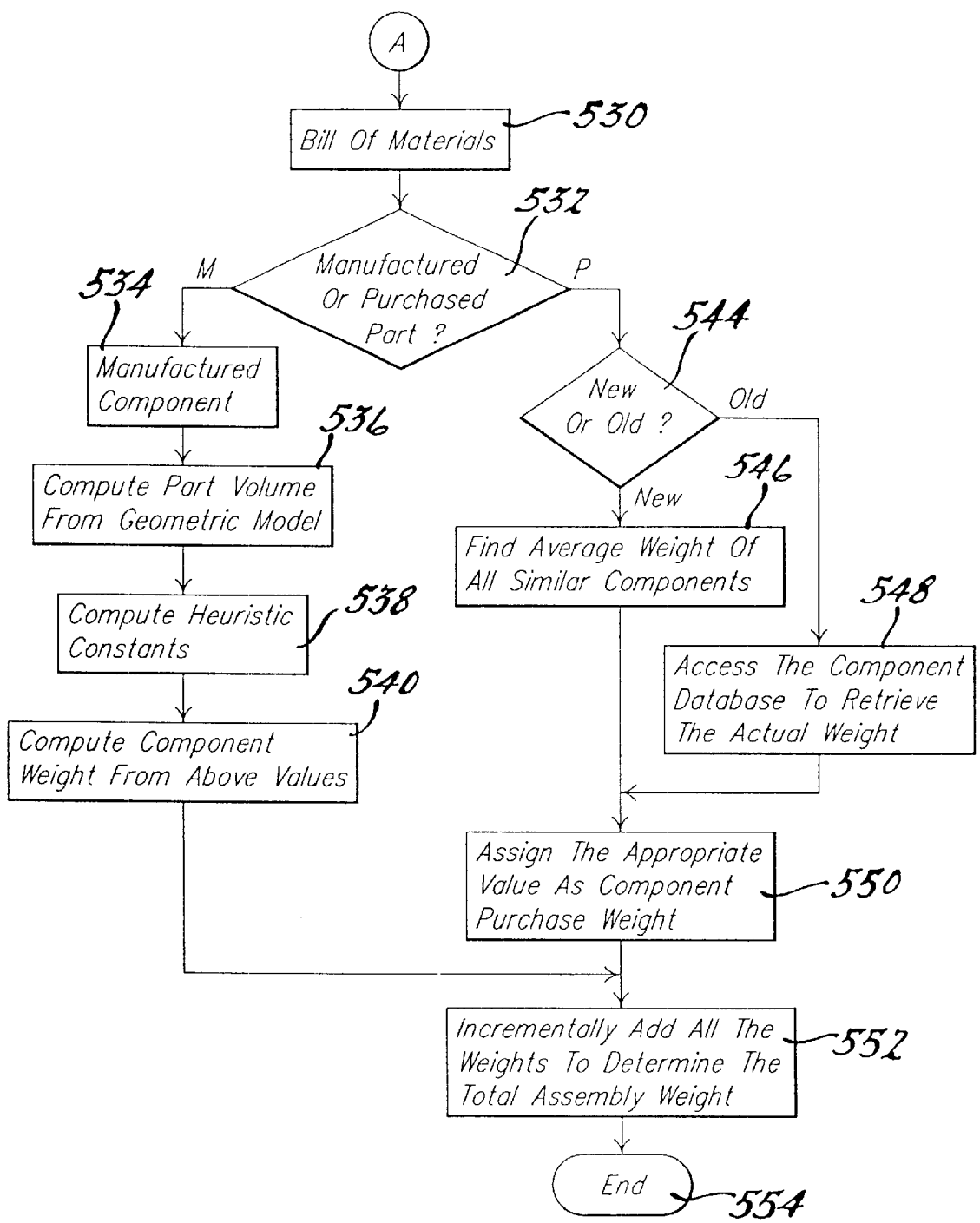
Figure 15:
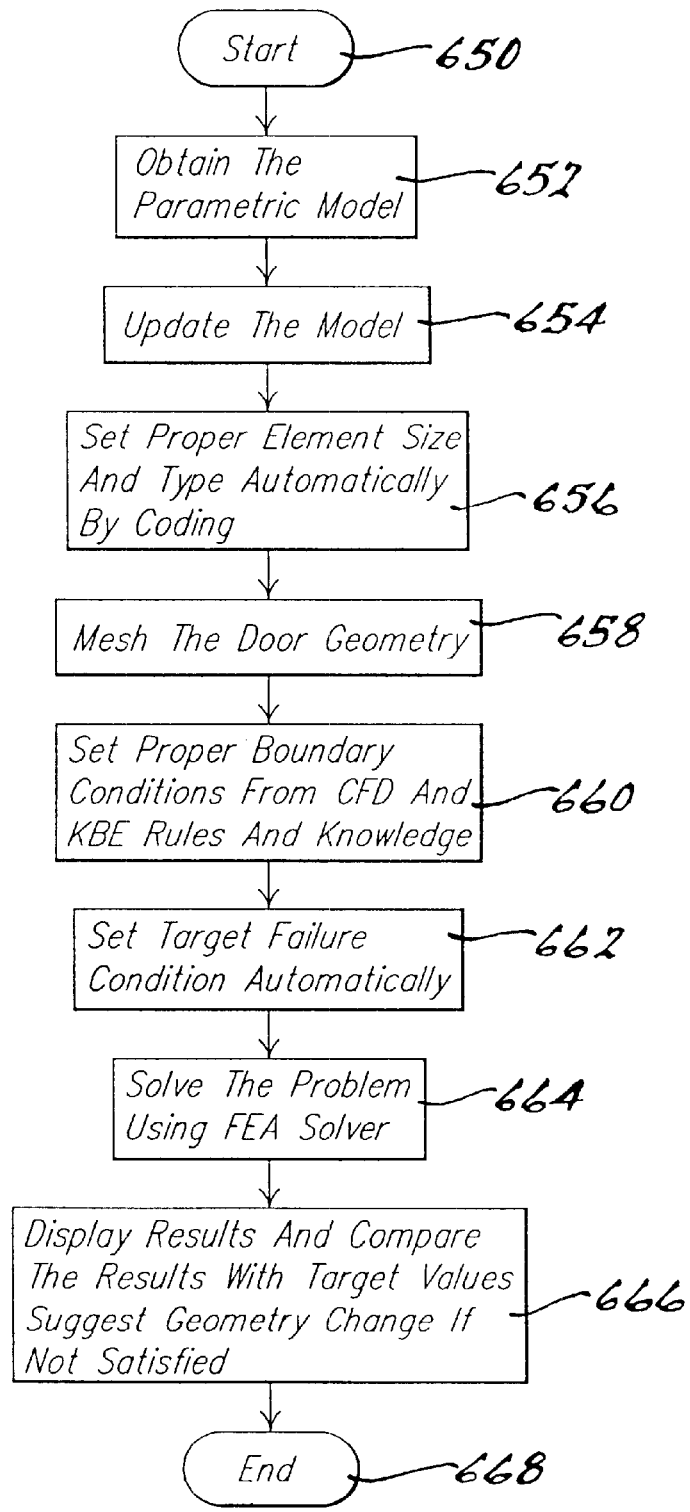
Figures 16, 17:
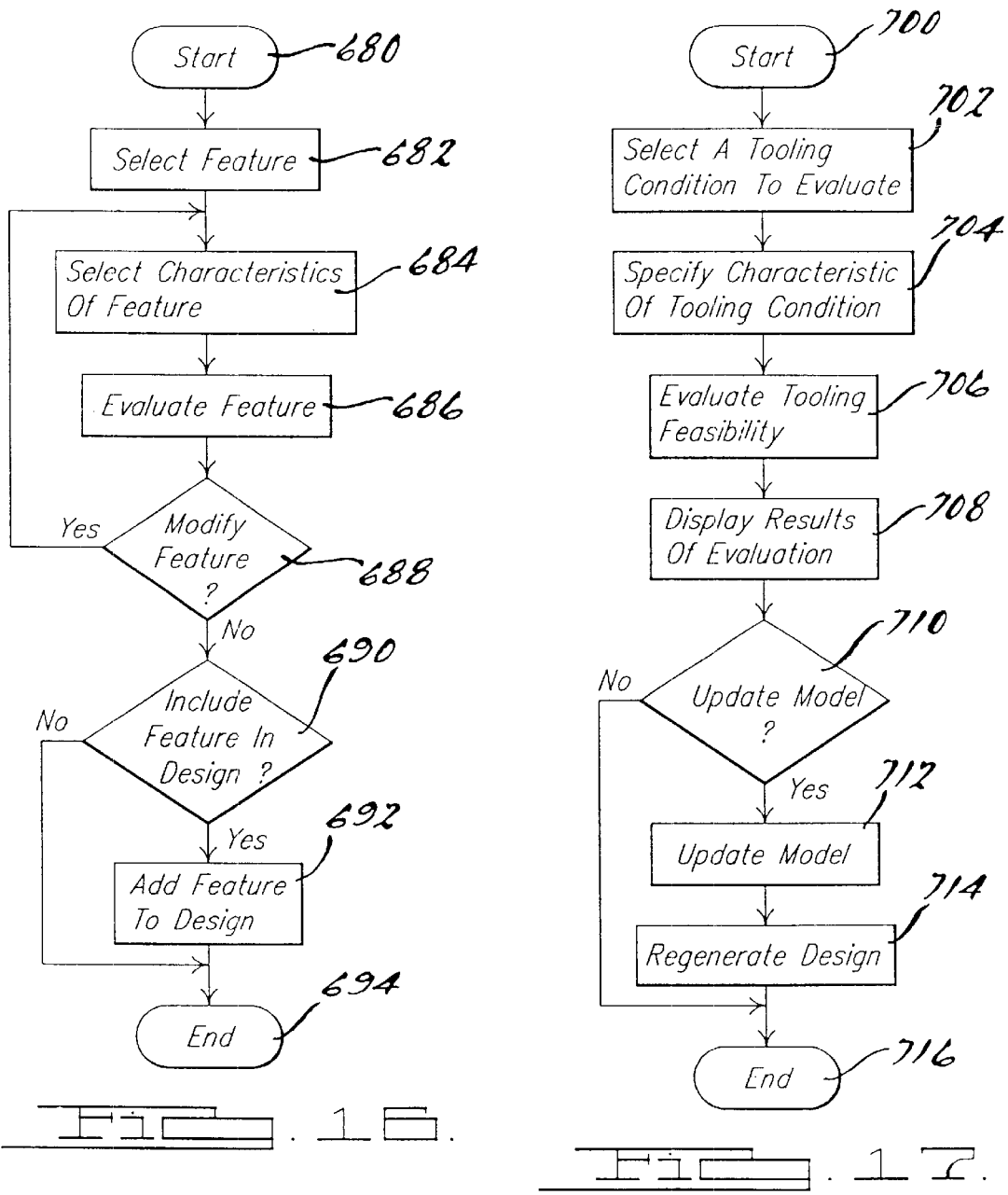

Returning to diamond 502, if a weight estimate is selected, the methodology advances to circle A in FIG. 13b. From circle A, the methodology advances to block 530. In block 530, the methodology prepares a bill of materials for the model of the HVAC air-handling assembly design. Preferably, the bill of materials is a list of component parts included in the model of the HVAC air-handling assembly design. The methodology advances to diamond 532 and determines if a particular component is a manufactured component part or a purchased component part.

If the particular component from the bill of materials is a manufactured component, the methodology advances to block 534 and determines manufacturing parameters for the component part. An example of a manufacturing parameter is material. Another example is density and wall thickness of a molded part. The methodology advances to block 536 and determines a volume for the component part, as defined in the product definition module. The methodology advances to block 538 and computes a heuristic formula, as is known in the art, for estimating the weight of the component part, using the manufacturing parameters. The methodology advances to block 540 and determines a weight for the component using the heuristic formula and component part volume. The methodology advances to block 552 to be described.

Returning to diamond 532, if the methodology determines that the component part is a purchased part, the methodology advances to diamond 544. In diamond 544, the methodology determines if the component part is a new part or an old part, such as by comparing part numbers. If the component part is a new part, the methodology advances to block 546. In block 546, the methodology determines an average weight of comparable parts from a database of component part weights maintained in the knowledge-based engineering library 112. The methodology advances to block 550, to be described.

Returning to diamond 544, if an old component part is selected, the methodology uses the actual component part weight for the component part from the database of component part weights in the knowledge-based engineering library 112. The methodology advances to block 550.

In block 550, the methodology uses the individual component part weight determined in either block 546 or 548 and advances to block 552. In block 552, the methodology determines a total weight for the HVAC air-handling assembly 10 by incrementally adding together all of the individual component part weights from block 550. The methodology advances to bubble 554 and returns to block 304 in FIG. 5.

Returning to block 304, if the user selects a computational fluid dynamics (CFD) module, the methodology advances to block 322. Advantageously, the CFD module simulates the performance of the HVAC air-handling assembly design to ensure that performance criteria, such as rules, guidelines or specifications are satisfied. The methodology advances to bubble 600 in FIG. 14. In bubble 600, the methodology advances to block 602 and continues.

In block 602, the methodology obtains a computer-aided engineering (CAE) model of the HVAC air-handling assembly 10 from the knowledge-based engineering library 112 and groups together related surface entities and surface attributes for a finite element analysis model. The methodology advances to block 604 and checks whether the CAE model is different from a computer-aided design (CAD) model from the knowledge-based engineering library 112, and highlight any new surfaces or entities so that they can be grouped appropriately. The methodology advances to block 606.

In block 606, the methodology specifies an operation mode and temperature door position for the HVAC air-handling assembly 10. An example of an operation mode is floor, panel, defrost, floor panel, or panel defrost. An example of a temperature door position is full heat, or full cool. The methodology advances to block 608.

In block 608, the methodology performs a CFD analysis to create a surface mesh of elements having a predetermined length, as known in the art. It should be appreciated that the element length can be specified by the methodology or the user 126. The methodology advances to block 610. In block 610, the methodology refines the surface mesh to improve the CFD analysis. Preferably, the surface mesh is refined by removing an undesirable element and automatically repairing the elements and nodes in the surface mesh. The methodology advances to block 612.

In block 612, the methodology converts the surface mesh into an appropriate volume mesh for further CFD analysis. The methodology advances to block 614 and sets appropriate boundary conditions for a predetermined volume zone within the volume mesh for a particular component, such as the evaporator core or heater core. The methodology advances to block 616.

In block 616, the methodology specifies a boundary condition of other HVAC air-handling assembly components, such as the blower wheel 44, duct and air-mix door 58. The methodology advances to block 618. In block 618, the methodology continues the CFD analysis of the HVAC air-handling assembly 10 using the previously described parameters. Preferably, the CFD analysis, as is known in the art, provides information regarding the performance of the HVAC air-handling assembly 10. The methodology advances to block 620.

In block 620, the methodology displays a summary of the CFD analysis of the HVAC air-handling assembly 10 on the video terminal 124b. Preferably, the summary includes information such as airflow and temperature distribution. The methodology advances to block 622 and displays a graphical representation or plot of the CFD analysis on the video terminal 124b. The methodology advances to bubble 624 and returns to block 304 in FIG. 5.

Returning to block 304, if the user 126 selects a structural analysis module, the methodology advances to block 324. Advantageously, the structural analysis module integrates a finite element structural analysis (FEA) into the design of the HVAC air-handling assembly 10. In block 324, the methodology advances to bubble 650 shown in FIG. 15.

In bubble 650, the methodology advances to block 652. In block 652, the methodology obtains a model, such as a parametric model, of HVAC air-handling assembly 10 from the knowledge-based engineering library 112. The methodology advances to block 654 and updates the parametric model of the HVAC air-handling assembly 10, or a portion thereof, using parameters specified for the HVAC air-handling assembly 10 from the product definition module. The methodology advances to block 656.

In block 656, the methodology automatically sets an appropriate element size and type. The methodology advances to block 658 and uses a finite element analytical method to create a mesh of the door geometry. The methodology advances to block 660 and sets appropriate boundary conditions for the FEA analysis using information from the CFD analysis and predetermined criteria from the knowledge-based library. The methodology advances to block 662. In block 662, the methodology sets a target failure condition for the FEA analysis. The methodology advances to block 664.

In block 664, the methodology conducts a finite element analysis using an analysis tool 118, previously described, to determine the structural characteristics of the model of the HVAC air-handling assembly design. The methodology advances to block 666 and displays the results of the finite element analysis on a video terminal 124b. Preferably, the results of the analysis are compared with predetermined target criteria from the knowledge-based engineering library 112. Likewise, geometric changes to the HVAC air-handling assembly design are suggested if the computed values do not meet the target criteria. The methodology advances to block 668 and returns to block 304 in FIG. 5.

Returning to block 304 in FIG. 5, if the user 126 selects a feature library module, the methodology advances to block 326. Advantageously, the feature library module contains features, such as cutouts, bosses, snaps, sections and blower scroll wireframe, that can be added to the HVAC air-handling assembly design. The features can be evaluated using the knowledge-based engineering library 112. In block 326, the methodology advances to bubble 680 shown in FIG. 16. In bubble 680, the methodology advances to block 682.

In block 682, the user 126 selects a particular feature to add to the HVAC air-handling assembly design. The methodology advances to block 684. In block 684, the user 126 selects attributes of the selected feature. For example, the parameters may be listed on a drop down menu, as is known in the art. It should be appreciated that the available parameters of the features are maintained within a feature description portion of the knowledge-based engineering library 112. The methodology advances to block 686.

In block 686, the methodology evaluates the selected feature to determine if a predetermined dimension of the selected feature complies with a predetermined criteria, such as a rule or guideline in the knowledge-based engineering library 112. It should be appreciated that the rule may be a design rule or a manufacturing rule. Preferably, a message regarding a violation of the predetermined criteria is displayed on the video terminal 124b. The methodology advances to diamond 688.

In diamond 688, the user 126 determines if the selected feature should be modified. If the selected feature should be modified, the methodology returns to block 684 previously described. If the selected feature should not be modified, the methodology advances to diamond 690. In diamond 690, the user 126 determines if the feature should be included in the design. If the feature should not be included in the design, the methodology advances to block 694 and returns to block 304 in FIG. 5. Returning to diamond 690, if the feature should be included in the design, the methodology advances to block 692 and includes the selected feature within the HVAC air-handling assembly design. The methodology advances to block 694 and returns to block 304 in FIG. 5.

Returning to block 304, if a tooling feasibility module is selected, the methodology advances to block 328. Advantageously, the tooling feasibility module evaluates individual component parts within the HVAC air-handling assembly design for certain predetermined conditions that could have an effect on tooling the component part, so that these conditions can be avoided. One example of a condition is die-lock, as is known in the art. Other examples of conditions known in the art include a sharp edge and an inadequate draft angle. Advantageously, if a certain tooling condition is identified early in the design process and avoided, time, effort and cost can be saved. The methodology advances to bubble 700 shown in FIG. 17.

In bubble 700, the methodology advances to block 702. In block 702, the methodology selects a tooling condition to evaluate, such as a die lock, a draft angle specification, or a sharp edge identification. The methodology advances to block 704. In block 704, the user selects a specific characteristic of the tooling condition, such as die open direction, as is known in the art. The methodology advances to block 706. In block 706, the methodology evaluates the model of the HVAC air-handling assembly design relative to a predetermined tooling criteria, such as a guideline or rule, stored in the knowledge-based engineering library 112 for the specified tooling condition. One example of a rule is that the draft angle be a minimum of 0.50 degrees to have a sufficient draft. It should be appreciated that the user 126 may select to evaluate the entire HVAC air-handling assembly 10, or a portion thereof. The methodology advances to block 708.

In block 708, the methodology displays the results of the tooling feasibility analysis on the video terminal 124b. For example, the methodology displays a message such as "the selected edge is not a sharp edge". The methodology advances to diamond 710 and the user 126 selects whether the model of the HVAC air-handling assembly 10 should be updated. If the model should not be updated, the methodology advances to bubble 716 and returns to block 304 in FIG. 5. Returning to diamond 710, if the model should be updated, the methodology advances to block 712. In block 712, the user updates the model by changing a parameter. For example, the user 126 may revise the draft angle. The methodology advances to block 714 and regenerates the model. The methodology advances to bubble 716 and returns to the block 304 in FIG. 5.

Returning to block 304, if the user 126 selects a knowledge-based library module, the methodology advances to block 330. In block 330, the user 126 selects a particular library from a predetermined list of libraries. Advantageously, the knowledge-based engineering library module provides the user 126 with access to other libraries. It should be appreciated that the library may be a web-based library. One example of a library is a design guideline library, containing information regarding design guidelines and requirements. Another example of a library is a bookshelf of available reference documents.

Returning to block 304, if the user 126 selects the final design module, the methodology advances to block 338. In block 338, the HVAC air-handling assembly design is complete and the methodology advances to bubble 340 and ends.

Referring to FIG. 18, a representative system 1000 for implementing the method for designing the HVAC air-handling assembly 10, according to the present invention, is illustrated. The system 1000 includes a processing unit 1002 connected to a user interface which may include a video terminal 1004, a keyboard 1006, a pointing device, such as a mouse 1008, and the like. The processing unit preferably includes a central processing unit 1002, a memory, and stored instructions which implement the method for designing the HVAC air-handling assembly 10, according to the present invention. The stored instructions may be stored within the processing unit 1002 in the memory, or in any non-volatile storage such as magnetic or optical media, EPROM, EEPROM, or the like. Alternatively, instructions may be loaded from removal magnetic media 1010, such as a removal disk, sometimes called a floppy disk, optical media 1012, or the like. In a preferred embodiment, the system 1000 includes a general-purpose computer program to implement the functions illustrated and described with reference to FIGS. 1–17. Of course, a system 1000, according to the present invention, could also be embodied with a dedicated device which includes various combinations of hardware and software. The preferred embodiment may also include a printer 1014 connected to the processing unit 1002, as well as a network connection for accessing a local server, an intranet, and the Internet. Preferably, solid modeling software, parametric design software, surface rendering software, animation software, and the like are used for developing the system 1000, according to the present invention.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of knowledge-based engineering cost and weight estimation of an HVAC air-handling assembly for a climate control system on a vehicle, the method comprising the steps of:

selecting a parametric model of an HVAC air-handling assembly design using a knowledge-based engineering library stored in a memory of a computer system;

selecting a component part from the parametric model of the HVAC air-handling assembly design;

determining a cost estimate of the component part using the knowledge-based engineering library;

using a summation of the component part cost estimate as the cost estimate of the HVAC air-handling assembly;

determining a weight estimate of the component part using the knowledge-based engineering library;

using a summation of the component part weight as the weight estimate of the HVAC air-handling assembly; and using the cost estimate and weight estimate in the HVAC air-handling assembly design.

2. A method as set forth in claim 1 including the steps of:

determining if the component part is manufactured or purchased, determining a manufacturing parameter for the component part from the knowledge-based engineering library and using the manufacturing parameter to estimate a manufactured component part cost, if the component part is manufactured;

determining a purchased component part cost from the knowledge-based engineering library, if the component part is purchased; and using a summation of the manufactured component part cost and purchased component part cost as the cost estimate of the HVAC air-handling assembly design.

3. A method as set forth in claim 1 including the steps of:

determining if the component part is manufactured or purchased;

determining a manufacturing weight parameter for the component part from the knowledge-based engineering library and using the manufacturing weight parameter to estimate a manufactured component part weight, if the component part is manufactured;

determining a purchased component part weight from the knowledge-based engineering library, if the component part is purchased; and using a summation of the manufactured component part weight and purchased component part weight as the weight estimate of the HVAC air-handling assembly design.

4. A method as set forth in claim 1 wherein said step of selecting a component part comprises defining a component part within the model of the HVAC air-handling assembly from a component part library within the knowledge-based engineering library.

5. A method of knowledge-based engineering cost estimation of a HVAC air-handling assembly for a climate control system on a vehicle, the method comprising the steps of:

selecting a parametric model of an HVAC air-handling assembly design using a knowledge-based engineering library stored in a memory of a computer system;

selecting a component part from the parametric model of the HVAC air-handling assembly;

determining if the component part is manufactured or purchased;

determining a manufacturing cost parameter for the component part from the knowledge-based engineering library and using the manufacturing cost parameter to estimate a manufactured component part cost, if the component part is manufactured;

determining a purchased component part cost from the knowledge-based engineering library, if the component part is purchased; and using a summation of the manufactured component part cost and purchased component part cost as the cost estimate of the HVAC air-handling assembly design.

6. A method as set forth in claim 5 wherein said step of selecting a component part comprises defining a component part within the model of the HVAC air-handling assembly from a component part library within the knowledge-based engineering library.

7. A method as set forth in claim 5 wherein said step of determining a manufacturing cost parameter comprises determining a component part volume from a product definition library within the knowledge-based engineering library.

8. A method as set forth in claim 5 wherein said step of defining a manufacturing cost parameter comprises defining parameters relevant to manufacturing the vehicle from a product definition library within the knowledge-based engineering library.

9. A method as set forth in claim 5 wherein said step of estimating a manufactured component part comprises estimating the manufactured component part cost using a heuristic formula and the manufactured cost parameter.

10. A method as set forth in claim 5 including the steps of determining if a purchased component part is new or old and using an average cost of similar component parts if the purchased component part is new and using an actual cost if the purchased component part is old.

11. A method of knowledge-based engineering weight estimation of a HVAC air-handling assembly for a climate control system on a vehicle, the method comprising the steps of:

selecting a parametric model of an HVAC air-handling assembly design using a knowledge-based engineering library stored in a memory of a computer system;

selecting a component part from the parametric model of the HVAC air-handling assembly;

determining if the component part is manufactured or purchased;

determining a manufacturing weight parameter for the component part from the knowledge-based engineering library and using the manufacturing weight parameter to estimate a manufactured component part weight, if the component part is manufactured;

determining a purchased component part weight from the knowledge-based engineering library, if the component part is purchased; and using a summation of the manufactured component part weight and purchased component part weight as the weight estimate of the HVAC air-handling assembly design.

12. A method as set forth in claim 11 wherein said step of selecting a component part comprises defining a component part within the model of the HVAC air-handling assembly from a component part library within the knowledge-based engineering library.

13. A method as set forth in claim 11 wherein said step of determining a manufacturing weight parameter comprises determining a component part volume from a product definition library within the knowledge-based engineering library.

14. A method as set forth in claim 11 wherein said step of defining a manufacturing weight parameter comprises defining parameters relevant to manufacturing the vehicle from a product definition library within the knowledge-based engineering library.

15. A method as set forth in claim 11 wherein said step of estimating a manufactured component part weight comprises estimating the manufactured component part weight using a heuristic formula and the manufactured weight parameter.

16. A method as set forth in claim 11 including the steps of determining if a purchased component part is new or old and using an average weight of similar component parts if the purchased component part is new and using an actual weight if the purchased component part is old.

* * * * *

UNITED STATES PATENT AND TRADEMARK OFFICE
CERTIFICATE OF CORRECTION

PATENT NO.    : 6,477,518 B1  Page 1 of 1
DATED         : November 5, 2002
INVENTOR(S)   : Yuan John Li, Mawutor Kofi Kpeglo, and Yung-Sen Steven Sheng It is certified that error appears in the above-identified patent and that said Letters Patent is hereby corrected as shown below:

<u>Title page,</u>
Item [75], Inventor's name "Yung-Sen Steven Shang" should read
-- Yung-Sen Steven Sheng --

Signed and Sealed this

Sixteenth Day of September, 2003

JAMES E. ROGAN
*Director of the United States Patent and Trademark Office*